United States Patent Office 3,287,828
Patented Nov. 29, 1966

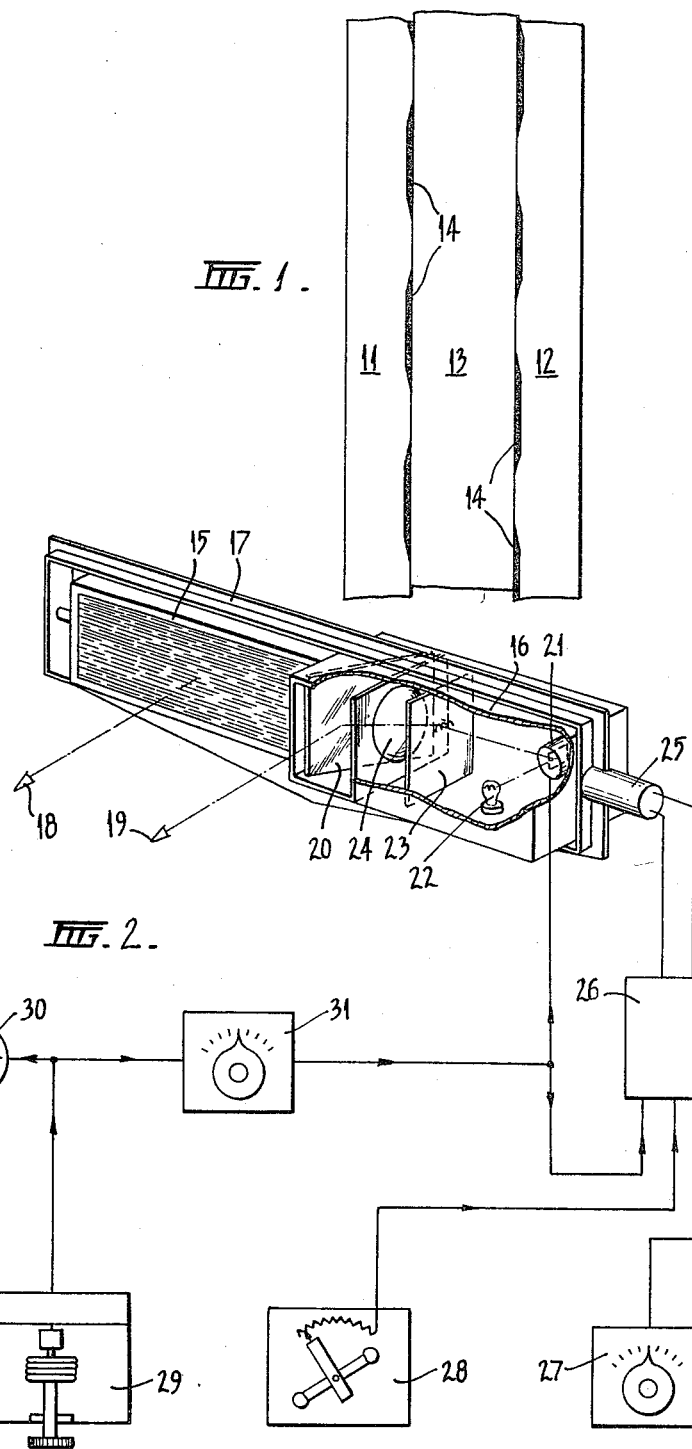

3,287,828
LOW VISIBILITY SIMULATION SCREEN
Ronald William Cumming, Brighton, Victoria, Australia, assignor to Commonwealth of Australia, Crown Solicitor's Office, Canberra, Australia
Filed Nov. 4, 1964, Ser. No. 408,796
Claims priority, application Australia, Nov. 5, 1963, 37,270/63
7 Claims. (Cl. 35—12)

This invention relates to a low visibility simulation screen and is concerned more particularly with a screen to be used as a means of training pilots to land large aircraft in conditions of low visibility.

For modern commercial airline operation it is most desirable that pilots should be capable of safely landing large aircraft in visibilities down to 100 feet vertically and ⅛ of a mile forwardly, and there is an urgent need for means for training pilots to achieve this standard.

In the past, low visibility training has been conducted by requiring the trainee pilot to make an instrument approach with an opaque screen obscuring the windshield, whereupon at the appropriate altitude the screen is removed and the pilot is allowed to land the aircraft with clear visibility. Obviously this method of training is not very satisfactory, since it does not reproduce accurately the conditions which are met with in practice. In practice, the pilot does not suddenly obtain a clear view of the ground at 100 feet or some other arbitrary distance; he obtains a diffused view of a limited section of ground in front of the nose of the aircraft and the limited visual zones available to him make the landing judgement much more difficult than it would be in clear conditions.

It has also been attempted to train pilots using a screen of graded opacity, mounted on a roller and located in front of the windshield. The opacity of the screen was greatest at the top and its effect was to cut off visibility completely at a specified distance in front of the aircraft, with a graded degree of visibility from that region to the nose of the aircraft. With such an arrangement it was necessary for a person other than the pilot to turn the roller to raise or lower the screen so as to compensate manually for aircraft altitude and pitch attitude. Although some success was achieved with this apparatus, it was in general unsatisfactory because it was far too sensitive to the height of the pilot's eye. If the pilot lowered his eyes by half an inch, which could be done quite unconsciously, the range of his forward view at an altitude of 50 feet was doubled. It has been proposed to employ a screen of graded opacity in conjunction with means for moving it automatically to compensate it for changes in the height of the pilot's eye, but it is considered that anything of this nature is more bulky and expensive than is desirable.

It is an object of this invention to provide simple and effective means which can be fitted to an aircraft and which will be effective in training pilots to land the aircraft in low visibility, and which does not require adjustment to compensate for changes in eye height.

With this object in view the present invention broadly resides in a screen comprising in one plane a plurality of parallel narrow opaque zones separated by zones of at least partial transparency, and in a second parallel and adjacent plane a second plurality of narrow opaque zones parallel to the firstmentioned narrow opaque zones and separated by zones of at least partial transparency.

In order to avoid undesirable diffraction effects it is preferred that the narrow opaque zones should not terminate in sharp lines, but instead that there should be a region at each edge of these zones in which the opacity is graduated to complete or partial transparency.

A screen according to the invention can be prepared by forming the parallel narrow opaque zones on the internal surfaces of a pair of parallel glass plates. One convenient method of preparing the zones is by printing them photographically. This process permits the vignetting, or the graduation of the opacity at the edges of the zones, to be carried out effectively.

It is preferred that the number of opaque zones should be of the order of from 40 to 100 lines per inch. The distance between the two surfaces will vary according to the number of lines per inch and the sharpness of gradation required between the opaque and partially clear areas of the screen. With a spacing of 60 lines per inch a gap of between 0.010 inch and 0.100 inch would normally be used. For other spacings these dimensions would vary inversely as the number of lines per inch.

It is desirable that the opaque zones should be of uniform width and spacing, and that the width should be greater than the space between them.

In one practical arrangement which has been found highly satisfactory, the spacing of the opaque areas is approximately 50 to the inch, each opaque zone having a width of 0.009 inch with an additional area of 0.003 inch vignetting at each edge, and a clear zone of 0.006 inch to the commencement of the vignetting of the next opaque zone.

The screen is normally constructed and arranged so that the zones in the plane nearer the pilot's eye are somewhat above the corresponding zones of the other plane, whereby it is impossible to see through the screen in the horizontal direction or in a line of sight inclined upwardly from the horizontal direction, but it is possible to see through the screen with a great deal of attenuation, along a line of sight inclined downwardly below the horizontal direction. Below this line of sight, the vision improves towards the angular line of sight at which the opaque zones of the rearward plane are directly behind those of the forward plane.

Control of the line of cut-off can be readily affected by rotation of the screen in the pitch plane and, if desired, it may be fitted for automatically compensating for changes of altitude. The normal requirement is to rotate the screen in a nose-up sense as altitude decreases in order to provide a progressive increase in the size of the visual sector. However, any pitching motion of the aircraft should not be permitted to change the angle of the screen relative to the horizontal. Therefore it is appropriate to provide a gyro stabilised servo control system with an automatic input from an altitude sensing device arranged to produce a prescribed change in screen angle with altitude.

In the following description of a preferred arrangement according to the invention reference is made to the accompanying drawings wherein:

FIGURE 1 is a diagrammatic fragmentary vertical cross-section through a screen, and FIGURE 2 is a diagrammatic representation of a screen and control means therefor.

Referring firstly to FIGURE 1 there is shown therein a screen according to the invention comprising two parallel clear glass plates 11 and 12 with a clear glass spacing plate 13 between them. Each of the clear plates 11 and 12 has parallel narrow opaque zones 14 printed photographically thereon on the inner face, i.e. those contacting the spacing plate 13. The opaque portions of the zones 14 are shown diagrammatically by the thickened lines and the vignetting is represented by the tapering off of the ends of these lines. The arrangement is such that the lower edge of the fully opaque portion of each zone 14 of the leading clear plate 12 is level with the upper edge of the fully opaque portion of a corresponding zone of the trailing plate 11, when the plates are disposed in vertical planes. In normal use the screen is tilted slightly forwardly in the nose-down sense thereby providing the desired effect on the vision of the trainee pilot.

FIGURE 2 shows diagrammatically the manner in which a screen according to the invention can be supported for partial rotation in the pitch plane under the control of an assistant, and with automatic compensation for changes of altitude and attitude of the aircraft. The screen 15 and an optical box 16 are fixed end to end and are mounted in a rectangular frame 17 for pivotal movement about an axis which extends lengthwise of the frame. The frame 17 is fixed in position behind the windscreen of the aircraft so that the screen takes in the whole of the field of vision of the trainee pilot, whose eye is denoted at 18, and so that the left hand end of the optical box 16 is directly forward of the position of the eye 19 of an assistant to the instructor. The said left hand end of the optical box 16 has a rectangular opening at front and back whereby the assistant can see through the box to the horizon, but vision is partly obscured by a semi-silvered plane mirror 20 set at 45° to the swivelling axis. At the opposite end of the optical box 16 a mirror galvanometer 21 is mounted and a lamp 22 with a straight filament is fitted in a socket on the floor of the optical box. A translucent projection screen 23 is fixed in the box between the mirror galvanometer 21 and the mirror 20 so that an image of the lamp filament is projected onto it by the galvanometer mirror, and a collimating lens 24 is disposed between the screen 23 and the mirror 20. Thus the assistant looking into the optical box sees the external scene with the image of the lamp filament superimposed thereon and focused at infinity.

An electrically operated servo-motor 25 is provided to move the screen and optical box relative to the frame 17, and is operated through leads from a computer 26. The computer is operated by voltage inputs from three sources. One of these inputs is derived from a manually operable zero-setting control 27. The second input is derived from a gyroscope control 28 designed to function, over a period of a test run, to feed a voltage to the computer 26 which results in the screen being adjusted to compensate for change in pitch attitude of the aircraft. The third input is derived from a barometric altitude sensor 29 which functions to supply a voltage varying with the altitude of the trainee pilot's eye above the runway. This voltage is supplied to a visual indicator 30, and through a range setting control 31 to the computer 26 and also to the mirror galvanometer 21.

In the operation of this equipment the assistant sights through the optical box and aligns the image of the lamp filament on the horizon by adjusting the zero-setting control. The gyroscope control 28 can then be used to move the screen and optical box to compensate for changes in pitch attitude of the aircraft during the test. The altitude sensing device 29 functions to rotate the screen in a nose-up sense as altitude decreases, and the galvanometer mirror is also moved so as not to disturb the alignment of the filament image with the horizontal. The range setting control provides an adjustment on the altitude sensor output and this enables the instructor to vary the range of visibility for different test runs.

I claim:
1. A low visibility simulation screen for use by an instructor in training a pilot to land an aircraft in conditions of low visibility said screen being disposed in the field of vision of each trainee but not in the field of vision of his instructor, said screen comprising in a first plane a plurality of parallel narrow opaque zones spaced apart by zones of at least partial transparency, and in a second parallel and adjacent plane a second plurality of narrow opaque zones parallel to the firstmentioned narrow opaque zones and spaced apart by zones of at least partial transparency, the opaque zones in said first and second planes being uniform in width and spacing and having a width greater than that of the spacing, the edges of the opaque zones being vignetted to provide gradual transition from opacity to transparency and vice versa, the spaces between opaque zones in said first and second planes being so small that a trainee is not consious of the existence of separate opaque and transparent zones but rather of a diffused view of the external scene.

2. A screen according to claim 1 wherein the opaque zones are formed on the internal surfaces of a pair of spaced parallel glass plates.

3. A screen according to claim 1 wherein the opaque zones are printed photographically.

4. A screen according to claim 1 wherein the number of opaque zones in each plane is of the order of forty to one hundred per inch.

5. A screen according to claim 1 wherein there are about fifty opaque zones to the inch in each plane, and each opaque zone has a width of about 0.009 inch with an additional width of about 0.003 inch vignetting at each edge.

6. A screen according to claim 1 having mounting means for rotating said screen about an axis which is horizontal and transverse relative to the aircraft and including means for moving the screen to compensate for changes in pitch and attitude of the aircraft.

7. A screen according to claim 6, further characterized in that the zones in the plane nearer the trainee are disposed slightly above the corresponding zones of the more remote plane whereby vision is obscured through the screen in the horizontal direction and in a line of sight inclined upwardly from the horizontal direction whereas attenuated vision is posisble along a line of sight inclined downwardly from the horizontal direction and with improved vision at that angular line of sight at which the opaque zones of the rearward plane are directly behind those of the forward plane.

References Cited by the Examiner
UNITED STATES PATENTS

| | | | |
|---|---|---|---|
| 2,403,195 | 7/1946 | Ross | 35—12 |
| 2,417,317 | 3/1947 | McMains | 35—12 |
| 2,492,969 | 1/1950 | Crane | 35—12 |
| 2,981,008 | 4/1961 | Davis et al. | 35—12 |
| 3,001,300 | 9/1961 | Green | 35—12 |
| 3,085,474 | 4/1963 | Bourgeaux et al. | 35—12 |

EUGENE R. CAPOZIO, *Primary Examiner.*

S. M. BENDER, *Assistant Examiner.*